April 9, 1940.  H. E. ANDERSON  2,196,242
CAR BRAKE
Filed Jan. 31, 1938  2 Sheets-Sheet 1
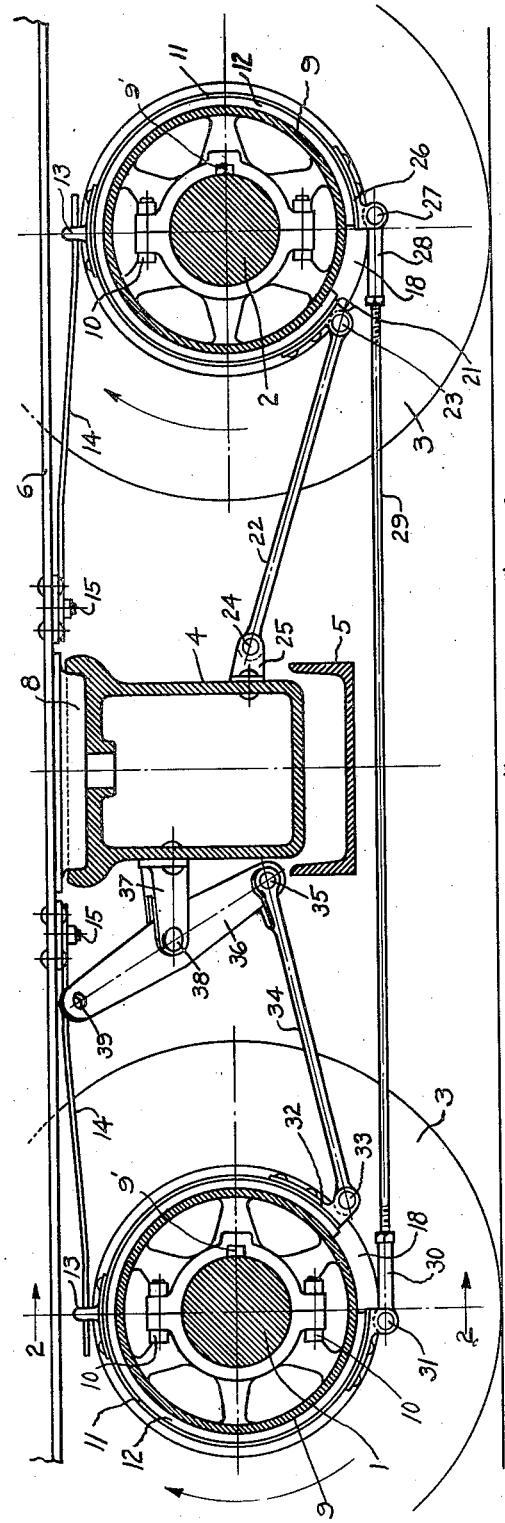
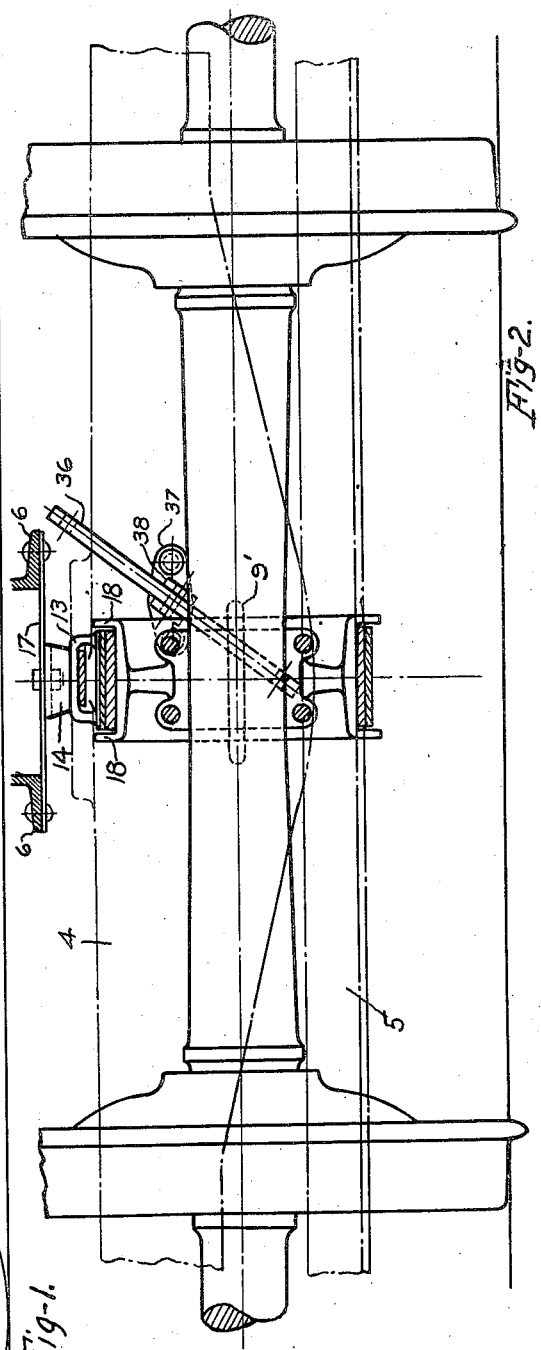
INVENTOR.
*Harley E. Anderson.*
BY
ATTORNEYS April 9, 1940.  H. E. ANDERSON  2,196,242
CAR BRAKE
Filed Jan. 31, 1938  2 Sheets-Sheet 2
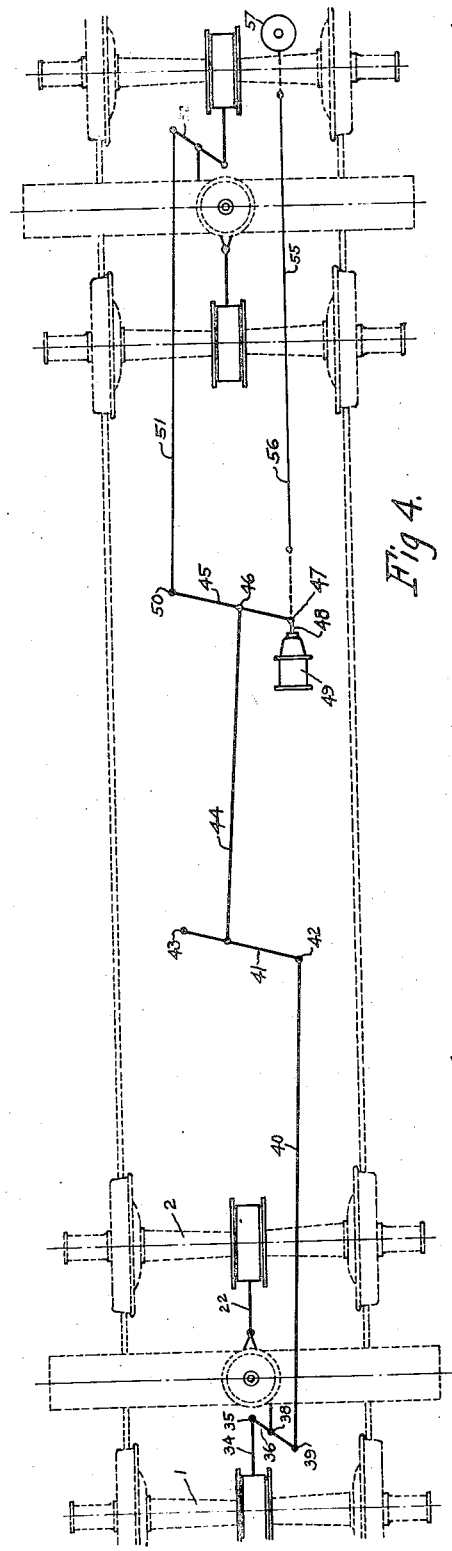
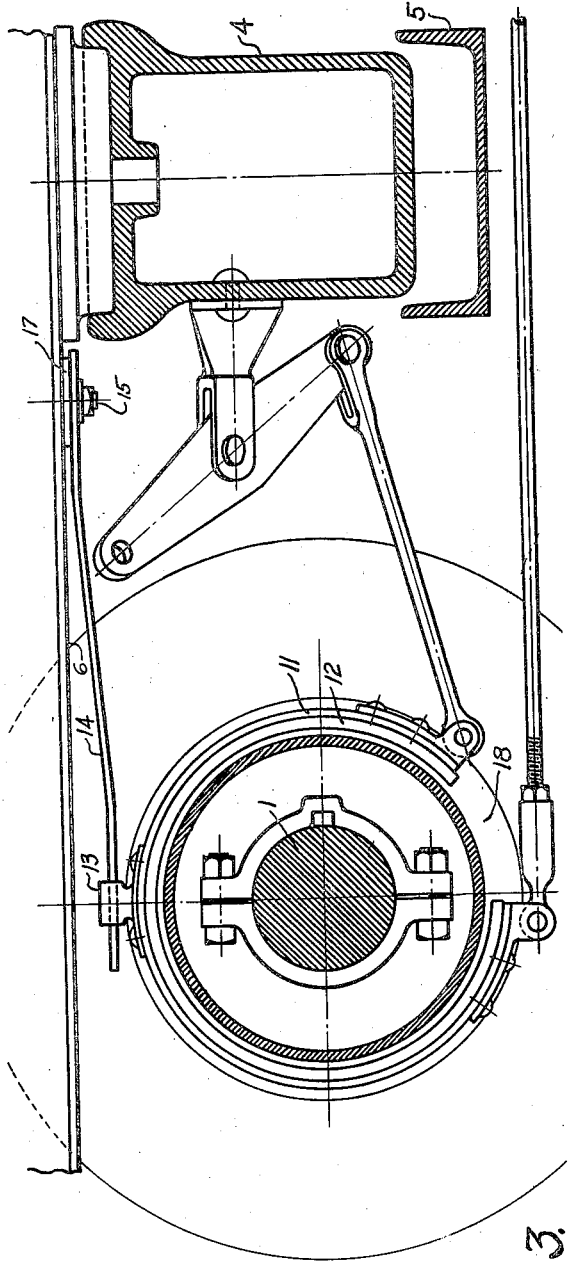
Fig. 4.
Fig. 3.
INVENTOR.
Harley E. Anderson.
BY
ATTORNEYS Patented Apr. 9, 1940

2,196,242

UNITED STATES PATENT OFFICE 2,196,242

CAR BRAKE

Harley E. Anderson, Chicago, Ill., assignor of one-half to W. F. White, Fort Worth, Tex.

Application January 31, 1938, Serial No. 187,789

5 Claims. (Cl. 188—58)

My invention relates generally to railway car brakes, and particularly a brake mechanism in which the braking power is applied to the axle of the car rather than to the wheels.

My invention has among its objects the production of a simple, light weight, inexpensive, durable and efficient brake equipment of the kind described, consisting of a minimum of parts and effective in operation by the application of a minimum power, and which can be adjusted to produce the desired braking effective force required by the rules and standard regulations.

Another very important object of the invention is that all of the parts of the brake rigging, except the brake drums, (which are rigidly attached to the axles) when released are carried by parts of the car frame and truck bolster which are spring supported by the usual truck springs and therefore will not wear so rapidly as is the case now where all of the brake rigging, namely, brake beams, brake shoes, bottom rods, truck levers, hangers, etc. are attached rigidly to the truck side frames and receive all shocks from high and low rail joints, crossings, etc., directly through the wheels and wear out very rapidly and fall upon the road bed, causing a derailment of the car.

A further object is the production of a brake rigging which may be so adjusted so as to be distributed over the several axles on the brakes and give the desired total force proportional to the car weight.

The invention has particularly as an object the production of a brake rigging in which the braking is done on the car axles rather than on the wheel treads and in which the brakes are self-energizing, the same being applicable for use with the standard power unit or brake cylinder and push rod now used in standard air brake practice. It also lends itself for use with the usual hand brake rigging employed in standard car construction practice.

A further object of the invention is the production of a brake rigging of the kind described which may be readily and economically installed, which is easy to adjust and in which replacement parts may be standardized and readily substituted for worn parts.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a sectional view of a portion of a car truck showing a portion of the brake rigging installed with the brakes applied;

Fig. 2 is a sectional view taken substantially on line 2—2 of Fig. 1;

Fig. 3 is a sectional view similar to a portion of Fig. 1, with the brake released; and Fig. 4 is a plan view showing diagrammatically the complete installation on the car.

Referring to the drawings, in which only a portion of the car is shown, and in Fig. 1 only diagrammatically, it may be mentioned that the device as illustrated is as it would be applied to a car having two of the standard railway freight car trucks, one adjacent either end of the car, and each truck having two axles and associated car wheels. The car and its trucks are shown, however, only to the extent considered essential to clearly illustrate the construction, application and operation of my improved brake rigging since other details of the car as constructed form no part of the present invention. Referring to Fig. 1, in which only one of the trucks is shown, 1 and 2 represent car axles provided with the usual car wheels 3 mounted or secured to the axles in any suitable manner. In the particular truck illustrated, 4 represents the spring supported bolster, 5 the spring plank which may or may not be employed, depending upon the particular truck construction, 6 represents the car sill and 8 the center bearing supported on the bolster 4. (Truck side frames, springs etc. are omitted.)

Arranged on each axle is a brake drum 9 of suitable proportions. To facilitate applying the drum to the axle, the same may be constructed in a plurality of parts secured together by bolts 10, any equivalent drum construction being satisfactory. The drum is now rotatably secured on the rotatable axle by a key 9' which prevents rotation of the drum on the axle, it being obvious that any equivalent arrangement may be employed. Arranged about each brake drum is a brake band 11 provided with any suitable brake lining 12, the band being in the form of a split ring with the two ends brought more or less adjacent to each other. In order to prevent the brake band from riding on the drum when disengaged from the drum, a suitable resilient adjustable support is provided, the same consisting of a spring 14 made up of one or more leaves which extends through and engages the member 13 on the band and which is secured at its opposite end to the car sill or other part of the car by a bolt 15 or the equivalent. All of the band supports are constructed substantially similar. The support 14 being adjustably secured to the wheel in the manner described, permits the same to be moved laterally at the band or free end of the support to allow the truck to go around curves. The member 14, by being resilient, permits the brake band to adjust itself vertically with the brake drum and axle. The drums 9 are preferably provided with side flanges 18 so that the band is always maintained in operative relation with the drum.

One end of one band, as shown band 11 on the axle 2, has its end 21 connected to a rod 22 at 23, the opposite end being secured at 24 to a bracket 25 or its equivalent carried by the car structure, as shown by the bolster 4. This fixed band or fulcrum rod 22 serves as a fulcrum for the end 21 of the band on axle 2. The opposite end 26 of the band on axle 2 is connected by a rod 29 to one end 31 of the adjacent band on the axle 1. As shown, a fitting 28 is pivotally secured at 27 to the end 26 of the one band and a fitting 30 similarly secured to the end 31 of the opposite band, the two fittings being connected by rod 29 by a threaded engagement. This affords a simple adjustable combination. The opposite end 32 of the band at axle 1 is connected to a movable actuating or operating band rod 34, the same being connected to the band at 33. The opposite end of the rod 34 is pivotally connected at 35 to a live lever 36 which is shown pivotally carried at 38 from the bracket 37 secured to the truck bolster 4. The opposite end of the arm 36 at 39 is connected through suitable rods and levers with the power unit or air cylinder. The preceding covers the units at each end of the car which takes the place of the heretofore employed brake beams, brake shoes, hangers, etc., customarily employed on cars as a part of the air brake system.

Referring now to Fig. 4, in which the connecting members are shown only diagrammatically more particularly to enable me to disclose the operation, the end 39 of the live lever 36 is connected at 42 by a top rod 40 with the floating lever 41 which is in turn pivotally secured at 43 to a suitable part of the car frame or structure. The lever 41 is connected by a middle connecting rod 44 to a cylinder lever 45, one end of which is connected at 47 to the push rod 48 of the brake cylinder 49 or to the movable member of some power unit, whatever power may be employed for the purpose, a part of an air brake system being illustrated. A top rod 51 connected to the cylinder lever 45 at 50 is also connected to a live lever 52 corresponding to the previously described and illustrated live lever 36. The brake mechanism on the truck at the right hand side of Fig. 4 is similar to that previously described and shown in Figs. 1, 2 and 3.

When the brakes are released the same are substantially as shown in Fig. 3 with a clearance between the brake lining 12 and the drum surface or face, while when the brakes are applied they are substantially as shown in Figs. 1 and 2, that is to say, when a contracting type of brake band is employed. While I have described an external contracting brake, I do not wish to be understood as limiting the invention to such type of brake mechanism, as obviously it is immaterial whether a contracting or expanding band is employed for the purpose. When the push rod 48 is forced outwardly from the cylinder, as will be obvious by referring to Fig. 4, a pull is exerted on the rods 40, 44 and 51, thereby actuating the live levers 36 and 52 and applying the brakes.

Referring back to Fig. 1, when the upper end of live lever 36 is moved toward a truck bolster, the lower end exerts a push on the brake band end 32, but the opposite end of the brake band being anchored, the band grips the brake drum. At the initial movement of the movable or operating band rod 34, this tends to place rod 29 under tension, thereby exerting a pull on the band 11 on axle 2, but the end 21 is prevented from moving since it is anchored through the fulcrum rod 22 of the bolster 4, so that both bands on the axles are contracted, frictionally engaging the drum and applying a brake pressure to oppose the rotation of the axles. This is true at both ends of the car. If the car is moving to the right, the wheels will be turned clockwise as indicated by the arrows in Fig. 1, and as the brake bands frictionally engage the drums, the movement of the drums will tend also to tighten up the bands, since the opposite ends are more or less anchored so that the brake is self-energizing. It may be mentioned, however, that the brakes at the opposite ends of the car at this time are not self-energizing, but will be self-energizing when the travel of the car is in the opposite direction, at which time the brakes shown in Fig. 1 will not be self-energizing. One set at one end or the other of the car, however, will be self-energizing, depending upon the direction of travel of the car.

Not only is my rigging much lighter in weight than the brake rigging heretofore used, but it is more simple and more durable. The wear on the wheels heretofore caused by the brake shoes is entirely done away with. With my construction the brake shoes ordinarily used with the pins, brake beam gears, side frame arms, wear plates, brake beams, safety supports, etc., are entirely done away with, and my rigging, being of substantially less weight and fewer parts, enables me to reduce the weight of the car almost a thousand pounds. With this dead weight done away with, the cost of pulling it around is saved, enabling the same amount of pulling power to pull an additional paying load, which in itself is no small item saved.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a car brake system and in combination, a pair of associated brake drums mounted on the car axles, a brake band associated with, and encircling each drum, the ends of each band being positioned below its respective car axle, supplemental means for carrying said bands when disengaged from the drums, a compression member for connecting one end of one band to the car structure, means for connecting the other end thereof to an end of the associated band, and means for connecting the other end of the last mentioned band to actuating means common to the bands.

2. In a braking system for railway cars having a plurality of pairs of associated axles and wheels, a brake drum secured on each axle between the wheels carrying the same, a brake band encircling each drum operative to frictionally engage the same, a compression member for each pair of bands, each member operatively connecting an end of one of the bands of its respective pair to a part of the car structure, a rod connecting the other end to one end of the adjacent band of the pair, a live lever mounted on the car structure and operatively connected to the opposite end of said last mentioned band, a power unit, and means for operatively connecting said power units with said live levers.

3. In a car brake apparatus of the kind described and in combination, a railway car structure having a truck at each end, each truck including a pair of spaced axles and wheels with a truck bolster arranged between the two, a brake drum on each axle, a suitably supported brake band encircling each drum, one end of one of the bands at each truck having means for anchoring it to the car structure, means extending below said bolster for connecting the opposite end of said band to one end of the adjacent band at the truck, a power unit, and means for operatively connecting the power unit to the other end of each of said last mentioned bands, whereby all of the bands may be simultaneously controlled to engage or disengage the said drums.

4. In a brake apparatus of the kind described for railway cars and in combination, two pair of axles, brake assemblies including a brake drum and associated brake band for each axle, means for energizing one assembly from each pair, further means for transmitting the force created by the axle torque on one energized assembly to the companion assembly when the axles are rotated in one direction and similar means for transmitting such force from the other energized assembly to its companion assembly when the axles are rotated in the opposite direction.

5. In a car brake apparatus and in combination, a railway car structure having a truck at each end, each truck including a pair of spaced axles and wheels with a truck bolster arranged between the two, a brake drum on each axle, a brake band encircling each drum, the ends of each band being positioned below its respective axle, means for supporting each band when disengaged from its drum, a compression member for each truck connecting an end of one band with the car structure, a tension member positioned below the bloster and connecting the other end of that band with an end of the adjacent band, a power unit and means for operatively connecting said unit to the remaining free end of the last mentioned band of each truck whereby all of the bands may be simultaneously controlled to engage or disengage said drums.

HARLEY E. ANDERSON.